United States Patent

[11] 3,593,290

[72] Inventor Douglas A. Kerr
Albuquerque, N. Mex.
[21] Appl. No. 842,537
[22] Filed July 17, 1969
[45] Patented July 13, 1971
[73] Assignee Bell Telephone Laboratories, Inc.
Murray Hill, Berkeley Heights, N.J.

[54] ROUND ROBIN DATA STATION SELECTIVE CALLING SYSTEM
10 Claims, 1 Drawing Fig.

[52] U.S. Cl. 340/147, 178/2, 340/155
[51] Int. Cl. H04l 21/00, H04q 11/20
[50] Field of Search 340/152, 155, 183; 178/2, 3

[56] References Cited
UNITED STATES PATENTS
3,483,329 12/1969 Hunkins et al. 340/147 X

*Primary Examiner*—Donald J. Yusko
*Attorneys*—R. J. Guenther and Kenneth B. Hamlin

ABSTRACT: A transmission path arranged in a ring is looped through successive party line data stations. Any station can send to the other stations by splitting the line loop thereat and connecting the station transmitter to the outgoing side of the loop. All station transmitters are started by a common poll code which is sequentially passed from station to station until a bidding station is reached. The sending station reinitiates the cycling of the poll code by generating the code and applying it to the loop at the termination of the message. One station is arranged to insure that one, and only one, poll code is cycling the loop. The station applies the poll code to the loop if the code does not cycle through after a predetermined interval of time and also periodically opens the line loop to purge the loop of all signals thereon.

PATENTED JUL 13 1971 3,593,290
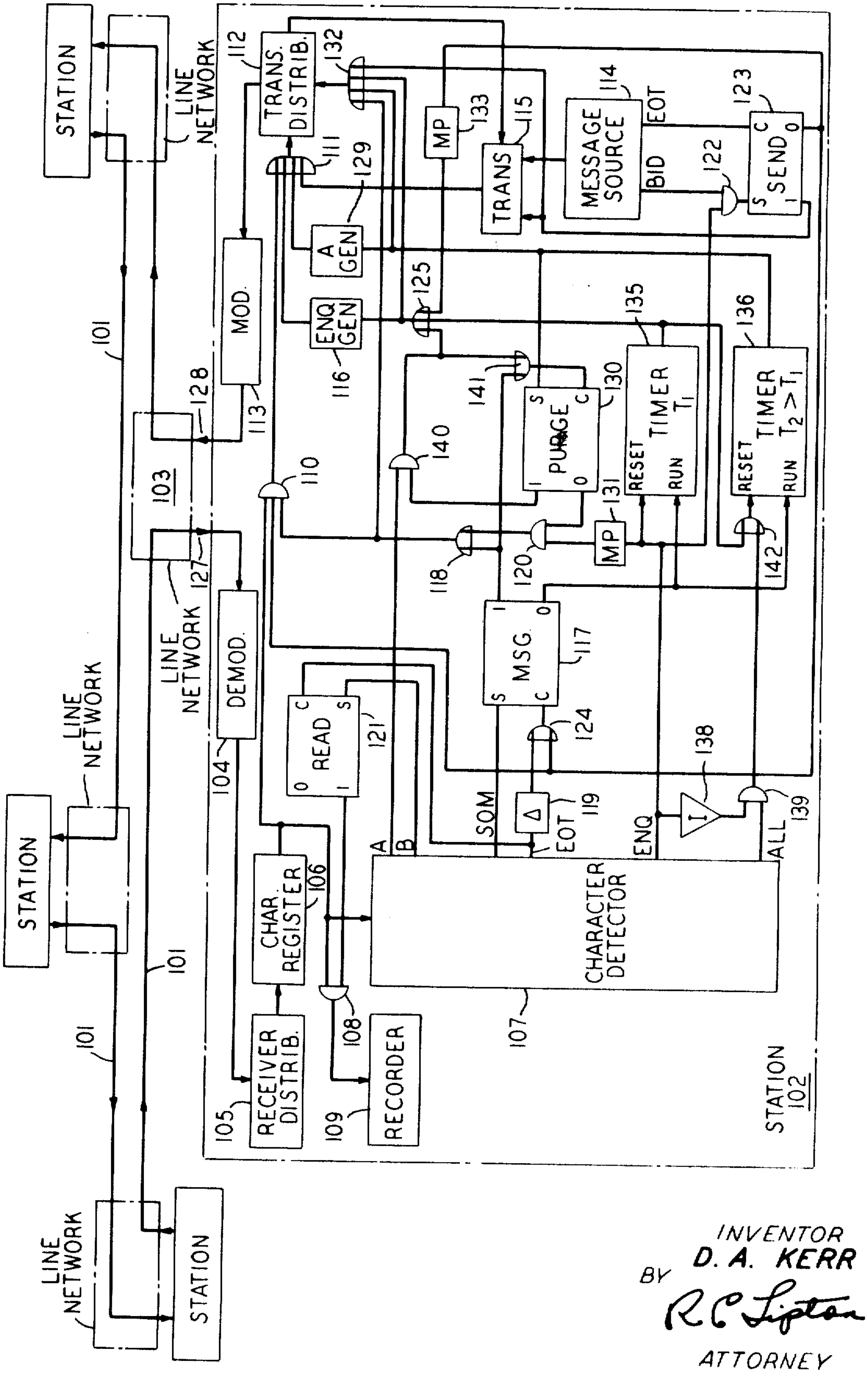
INVENTOR
D. A. KERR
BY R C Lipton
ATTORNEY

ROUND ROBIN DATA STATION SELECTIVE CALLING SYSTEM

FIELD OF THE INVENTION

This invention relates to a selective calling system for date stations on a transmission line arranged in a ring and, more particularly, to a round robin calling system wherein code signals offering control of the line loop are sequentially passed from station to station.

DESCRIPTION OF THE PRIOR ART

Private multipoint data circuits have sometimes been organized on a round robin basis wherein a transmission line, arranged in a ring, is looped through successive data stations to enable any station to communicate with one or more of the other stations. Each station monitors signals on the incoming side of the line loop and concurrently passes the signals to the outgoing side of the line loop whereby all stations receive the data signals. When a station desires to send a message, it seizes control of the line by splitting the line loop to disconnect the incoming side from the outgoing side. The data message is then passed to the outgoing side of the loop and thus received by all other stations and, in addition, received over the incoming line of the sending station. The sending station selects one or more stations to receive the message by sending the address code of each station of address to cut on the station recorder thereat and monitors the message by sending its own address code.

To preclude contention between the stations to seize control of the multipoint line, it is conventional to sequentially poll the stations, one at a time and in rotation, offering each polled station control of the line if it has a message to send. In accordance with a preferred multipoint ring circuit, each station is arranged to send the poll code of the next successive station when the sending station completes its message transmission and, alternatively, when the sending station is not bidding for control when it receives its poll code. In this manner, control of the loop is sequentially offered, round robin, to all the stations.

Each station, of course, must be arranged to generate the poll code individual to the next station, whereby each station differs in this respect from all other stations resulting in complexity of manufacture and installation. In addition, a system of this type lacks flexibility in adding and removing stations from the line without equipment modifications in the next prior stations in the sequence.

Accordingly, it is a broad object of this invention to simplify manufacture and installation and increase flexibility of multipoint round robin data circuits of the above-described type.

SUMMARY OF THE INVENTION

In accordance with the present invention, the several stations on the multipoint line are polled by a common poll or inquiry code. The stations are therefore arranged in the same manner (since the same poll code is utilized in every case) and stations can be added and removed without modifying the next prior station.

Since incoming signals are passed by each station to the next successive station, to preclude the passage of the common poll code to the next successive station before the prior station acts thereon (to seize control, for example), a code storage circuit is interposed in each station line loop between the incoming side and the outgoing side. Advantageously, the storage circuit stores, and thus delays, the poll code for an interval of time sufficient to permit the station to seize control and thus to split the line loop, disconnecting the output of the storage circuit from the outgoing side. Accordingly, if the station seizes control, the output of the storage circuit is opened and the common poll code stored therein is discarded. The message is thereupon sent to the line loop and at the termination thereof the common poll code is generated and applied to the line and thus passed to the next station.

Since the several stations are capable of generating and repeating the poll code, an arrangement must be provided to insure that more than one poll code is not cycling the multipoint circuit. In accordance therewith, one of the data stations includes a purging circuit which periodically opens the line loop at the station for a duration of time corresponding to the round trip propagation time of the multipoint line, thereby purging the line of any signals thereon. At the termination of the purging interval, the station generates and applies the poll code to the loop to again initiate the cycling of the code. It is a feature of this invention that the purging circuit determines the round trip propagation time by applying a predetermined code signal to the outgoing side of the station loop and by thereafter monitoring the incoming side of the loop for the reception of the predetermined code signal which has cycled around the line.

It is a further feature of the invention that at least one station generates and applies the poll code to the loop if the poll code becomes mutilated or lost.

The foregoing and other objects and features of this invention will be fully understood from the following detailed description of an illustrative embodiment thereof taken in conjunction with the accompanying drawing.

BRIEF DESCRIPTION OF THE DRAWING

The accompanying drawing discloses a block diagram of a multipoint round robin circuit with a plurality of data stations thereon together with a monitoring data station shown in schematic form, which monitoring data station includes the storage circuit and the purging circuit, in accordance with this invention.

DETAILED DESCRIPTION

In the drawing there is shown a plurality of stations, each of the stations connected by an associated line network to transmission line loop 101. Transmission line loop 101 is shown in the drawing as a solid metallic path which passes from line network to line network. Consider line network 103, for example, signals on line loop 101 are passed by way of line network 103 to line 127 which is connected to station 102. Outgoing signals from station 102 are applied to line 128, which is connected by line network 103 back into loop 101.

Line loop 101 may, as previously described, comprise the solid metallic path shown in the drawing and would, therefore, be capable of accommodating direct-current loop signals. Alternatively, line loop 101 may comprise a carrier channel for conveying frequency shift signals. In the former case, line network 103 may advantageously be arranged as a simple connector circuit as shown in the drawing or as a hub circuit which is capable of taking off incoming direct-current signals and applying them to line 127 and, alternatively, applying station signals on line 128 back to line loop 101. In the event that frequency shift carrier signals are being transmitted over the line loop, line network 103 will be a network configuration comprising a hybrid circuit arranged to accept incoming signals and pass them only to line 127 and accept station signals on line 128 and convey them only to the channel extending to the next station, as represented by the solid metallic path shown in the drawing.

Each of the stations includes certain basic equipment arranged in substantially the same manner. Station 102 is designated as a central monitoring circuit and includes certain additional circuitry, as described hereinafter.

Consider first the equipment common to each station. This generally includes a demodulator, generally indicated by block 104; receiver distributor 105; character register 106; transmitter distributor 112; modulator 113; recorder 109; character detector 107; message source 114; transmitter 115; and character generators 116 and 129, together with certain associated control logic circuitry. In general, it is the function of these circuits to receive incoming code characters and, under one condition, pass the code characters back onto the line loop and, under a second condition, open the line loop and generate code characters for application to the loop.

The incoming signals from the line loop are passed by line network 103 and lead 127 to demodulator 104. Demodulator 104 converts the line signals (direct-current or frequency shift) to direct-current binary data signals which can be handled by the binary circuits of station 102. These signals, which comprise multielement code characters in serial form, are converted to parallel form by receiver distributor 105 and passed to character register 106.

Character register 106 preferably includes a plurality of binary cells equal in number to the number of information code elements in the code character. When receiver distributor 105 applies the parallel elements of the code character to character register 106, the register, in turn, applies the character elements to its output. This output is shown as a single lead, but preferably comprises a plurality of leads equal in number to the number of elements in the code character. Accordingly, each lead has applied thereto a signal corresponding to one signal element.

The output leads of character register 106 extend to AND gate 110. Since we have assumed that the output leads comprise a plurality of leads or paths, gate 110 would correspondingly comprise a plurality of AND gates, one for each output lead of register 106. It is noted that AND gate 110 also has a first enabling lead extending to the output of OR gate 118 and a second enabling input lead extending to the "0" output terminal of SEND flip-flop 123. It is therefore further understood that these enabling leads extend to each of gates 110 under the assumption that a gate is provided for each output lead of register 106 and all gates simultaneously act, when enabled, to pass the parallel code elements. It is seen that the output of register 106 also extends to character detector 107 and to AND gate 108. AND gate 108 is arranged similarly to AND gate 110 and preferably comprises a plurality of AND gates to simultaneously pass the parallel elements when they are enabled.

Character detector 107 comprises a detector circuit which pulses one or more of its several output leads upon the completion of the registration of characters in register 106. Several of the characters, as described hereinafter, provide various control functions for station 102. Specifically, these characters include character "A," character "B," the start-of-message character "SOM," the end-of-transmission character "EOT" and the enquiring or polling character "ENQ." In addition, the time any character is fully registered by register 106, output ALL of character detector 107 is pulsed.

The output of AND gate 108 extends to recorder 109. When gate 108 is enabled to pass the code elements, it is the function of recorder 109 to print or record the corresponding code character registered by character register 106.

The output of AND gate 110 extends to transmitter distributor 112 by way of OR gate 111. We have presumed that AND gate 110 comprises a plurality of AND gates. OR gate 111, therefore, comprises a plurality of corresponding OR gates. Other inputs to OR gate 111 include the outputs of character generators 116 and 129 and transmitter 115.

It is the function of generators 116 and 129, when enabled, to code their output leads with the elements of the code characters "ENQ" and "A," respectively. It is the function of transmitter 115, when enabled, to scan the code character elements provided by message source 114 and code its several output leads with the code element signals of each code character as it scans the code character in message source 114. Message 114, in addition to providing the message code characters, energizes output lead BID when a message is available and station 102 desires to seize control of the line loop and, in addition, pulses output lead EOT when the last code character "EOT" is scanned by transmitter 115. Specifically, message source 114 provides the code message which comprises the start-of-message character "SOM" followed by the address characters of the various desired stations of address, including the address character for station 102 under the assumption that it is desired that the message be locally monitored. The address characters are then followed by the message text characters and concluded by the end-of-transmission character "EOT."

The various code character elements from AND gate 110, or, alternatively, from any one of the several described sources pass through OR gate 111 and are applied to transmitter distributor 112. Transmitter distributor 112, when enabled via OR gate 132, converts the parallel code elements to serial form and passes them to modulator 113, which then converts the elements to appropriate line signals for line loop 101. These line signals are then passed by way of lead 128 and line network 123 to line loop 101.

Three operating conditions of the line loop system will now be discussed, together with the operation of station 102. These conditions comprise the "idle," or "polling," state during which each station is offered control of the loop; the local station control state, when the local station, such as station 102 for example, seizes control of the line loop; and the remote station control state, when a station remote from the local station has seized control. It is to be understood that the operations and circuits described hereinafter relative to these three conditions are substantially identical to the operations and circuits in other stations unless it is otherwise noted that the circuit or operation is unique to station 102.

During the idle or polling state the character "ENQ" is circulated around the line loop. Each time the character "ENQ" is received by a station, the station determines whether or not it has a message and therefore desires to seize control of the line loop. If the station seizes control, it opens the line loop and initiates the local station control mode. On the other hand, if it does not desire to seize control, it repeats the character "ENQ" or back to the line loop so that the next station is offered control of the loop.

Assume now that the character "ENQ" is received from the line loop and applied by way of line network 103 and lead 127 to demodulator 104. The elements of the character are thereby demodulated and converted to serial form by receiver distributor 105, which, in turn, passes the character elements in serial to character register 106. Accordingly, the character elements of the code character "ENQ" are stored in the several bistable circuits of the register. It is noted that this storage is maintained until the reception of the next character which overwrites the character presently stored in register 106.

In the initial idle condition, AND gate 110 is disabled since MESSAGE flip-flop 117 is normally in the CLEAR state and AND gate 120 does not have an enabling pulse applied thereto from output lead ENQ of character detector 107. Accordingly, OR gate 118 is not applying an enabling potential to gate 110 and the gate does not pass characters registered by character register 106. When the code character "ENQ" is fully registered, however, and applied to character detector 107, output lead ENQ is pulsed. It is assumed that the local station does not have a message available at this time. Accordingly, message source 114 is not energizing output lead BID and gate 122, is, therefore disabled. The pulse on lead ENQ is passed to gate 122 but blocked by the gate to maintain SEND flip-flop 123 in the CLEAR state. Gate 120, however, is normally enabled by flip-flop 130 which is in the CLEAR state during the idle mode, as described hereinafter. The pulse on lead ENQ is passed to monopulser 131 which, in turn, produces a pulse having a duration corresponding to the scan period of transmitter distributor 112. This pulse is passed through AND gate 120 and OR gate 118 to AND gate 110. Since SEND flip-flop 123 is in the CLEAR state, the "0" terminal is high and AND gate 110 is, therefore, enabled for the period of the pulse from monopulser 131.

The output of OR gate 118 is also used to enable a cycle of operation of transmitter distributor 112 by way of OR gate 132. Code character "ENQ" which is stored by register 106 is, therefore, repeated through AND gate 110 and OR gate 111 to transmitter distributor 112 and the code character is converted to serial form by distributor 112 and converted to the appropriate line signal by modulator 113 and passed back to line loop 101. Thus the character "ENQ" is stored by register 106 to permit station 102 to seize control of the loop. However, in this assumed condition, station 102 does not desire to attain control of the line and the character is thereupon passed by register 106 to transmitter distributor 112 and, thus, repeated on to line loop 101.

It is noted that if, during the polling mode, a character other than "ENQ" is received, this character is stored by register 106 in substantially the same manner. However, gate 110 is not enabled and the character is, therefore, not passed around the loop. The character is thereafter overwritten by receiver distributor 105 when the next character is received and, therefore, discarded.

Station 102 makes a bid for control when a message is prepared and inserted into message source 114. Upon the insertion of this message the BID lead output of message source 114 is energized, thereby enabling AND gate 122. Station 102 now awaits the reception of the code character "ENQ," which reception offers control to the station.

When the code character "ENQ" is received it is demodulated, converted to parallel form and stored in character register 106, as previously described. Character detector 107 thereupon pulses output lead ENQ. With AND gate 122 now enabled, the pulse on lead ENQ is passed through the gate to set SEND flip-flop 123.

Upon the setting of SEND flip-flop 123 its "0" output terminal potential drops, removing the enabling potential applied to AND gate 110. This disables the AND gate for the period that station 102 has control of the line loop. Accordingly, this effectively opens up the line loop at station 102 and, at the same time, discards the "ENQ" character.

The setting of SEND flip-flop 123 also energizes its terminal "1" output. This passes an enabling potential to transmitter 115, thus enabling the transmitter to initiate the reading of the characters in message source 114. The potential on output terminal "1" of SEND flip-flop 123 is also applied through OR gate 132 is enable transmitter distributor 112. Thus, transmitter distributor 112 initiates its cycling operation and will repeatedly cycle so long as SEND flip-flop 123 is in the SET condition. With transmitter 115 enabled and transmitter distributor 112 released for its rotational operations, successive characters from message source 114 are scanned by transmitter 115, applied to transmitter distributor 112 by way of OR gate 111, and converted to serial form by the distributor for application to line loop 101. It is noted that transmitter distributor 112 controls transmitter 115 to advance to read the next character each time transmitter distributor 112 completes its rotational cycle. Thus, successive characters from message source 114 are passed to line loop 101.

As previously described, the first character in the message is the start-of-message code character "SOM." When this character loops around line loop 101 and back to station 102, it is registered in character register 106 and character detector 107 thereupon pulses output lead SOM. This sets MESSAGE flip-flop 117. The various functions of MESSAGE flip-flop 117 will be considered later. None of the functions, however, are necessary to understand the operation of station 102 when the station has seized control.

After the start-of-message character the various address codes are transmitted by station 102. Assuming that it is desired to monitor the message at station 102 (since this indicates whether all of the other addressee stations are properly receiving the message), the local address code is also transmitted, this address code having been previously assumed to be the code character "B."

When the code character "B" is passed around the line loop back to station 102 and registered in character register 106, character detector 107 pulses output lead B. This pulse is passed to the SET input of READ flip-flop 121 to set the flip-flop. With READ flip-flop 121 set, an energizing potential is passed from output terminal "1" to AND gate 108. AND gate 108 is therefore enabled and passes the received code characters from character register 106 to recorder 109. Accordingly, the message characters are thereafter recorded and printed by recorder 109.

After the transmission of the address characters, station 102 sends the message text. This text is, of course, printed by the various stations designated by the address code characters and by recorder 109 at station 102. The message text is then terminated by the end-of-transmission code character "EOT."

When the end-of-transmission code character "EOT" is read by transmitter 115, message source 114 pulses output lead EOT. This pulse is applied to the CLEAR input of SEND flip-flop 123, restoring the flip-flop to the CLEAR condition. When SEND flip-flop 123 is cleared, the enabling potential applied to transmitter 115 and applied to transmitter distributor 112 by way of OR gate 132 is removed. The cycling of transmitter distributor 112 thereupon ceases and the reading of message source 114 by transmitter 115 terminates.

Upon the restoration of SEND flip-flop 123 to the CLEAR condition, the increased potential on terminal output "0" provides a positive transition which is passed through OR gate 124 to the CLEAR input of MESSAGE flip-flop 117. This flip-flop is thereupon restored to the CLEAR condition. This starts the running of timers 135 and 136, whose functions will be described hereinafter. It is noted that timers 135 and 136 are utilized only in monitoring station 102 and are, therefore, not common to all of the stations. At the same time the increased potential on output terminal "0" of SEND flip-flop 123 enables monopulser 133. Monopulser 133 thereupon provides a pulse through OR gate 125. This pulse is passed to ENQ generator 116 to code transmitter distributor 112 with the code character "ENQ" by way of OR gate 111. At the same time, the pulse applied through OR gate 125 is also passed through OR gate 132 to release transmitter distributor 112 for a one character rotation. Accordingly, after the transmission of the code character "EOT," the code character "ENQ" is generated and passed on to the line loop to reinitiate the polling mode.

Finally, the clearing of SEND flip-flop 123 reestablishes the enabling potential on one of the enabled leads of gate 110. Since MESSAGE flip-flop 117 has also been cleared, the other input lead to AND gate 110 is not enabled at this time and gate 110 remains disabled.

When the code character "EOT" cycles around the line loop and is received by station 102, output lead EOT of character detector 107 is pulsed. This pulse clears READ flip-flop 121 and READ flip-flop 121, in turn, disables AND gate 108. The output of character register 106 is thereupon disconnected from recorder 109 and subsequently received code characters are therefore not recorded. The pulse on output lead EOT of character detector 107 is also passed through delay unit 119 and OR gate 124 to the CLEAR input of MESSAGE flip-flop 117. This pulse provides no function at this time, however, since the MESSAGE flip-flop was previously cleared.

With SEND flip-flop 123 now cleared and MESSAGE flip-flop 117 cleared, station 102 is restored to the idle condition. In addition, with the code character "ENQ" reapplied to the line loop, control of the line loop is thereupon offered to the next station. Accordingly, the previously described idle condition is repeated.

When another station seizes control of the line and initiates a transmission, the first character transmitted is the start-of-message character "SOM." When this character is received by station 102 and is fully stored by register 106, character detector 107 pulses output lead SOM to set MESSAGE flip-flop 117. Output terminal "1" of MESSAGE flip-flop 117 thereupon provides an enabling potential through OR gate 118 to AND gate 110 and, in addition, through OR gate 118 and OR gate 132 to enable the cycling of transmitter distributor 112. Accordingly, the elements of the start-of-message character and the succeeding characters are stored by character register 106 and are then passed through AND gate 110 and OR gate 111 to transmitter distributor 112. Since transmitter distributor 112 is initially enabled to cycle after the "SOM" character was fully stored, it lags, in phase, behind distributor 105 by almost a full character interval before it converts the "SOM"

character and the succeeding characters to serial form and reapplies them to line loop 101. Thus, when another station seizes control, the characters received by station 102 from the line loop are converted to parallel form, are temporarily stored in character register 106, are passed through AND gate 110 and OR gate 111 and are reconverted to serial form by transmitter distributor 112, which returns the character to the line loop.

If the remote station sends the address character of station 102, character detector 107 pulses output lead B to set READ flip-flop 121. AND gate 108 is thereby enabled, permitting recorder 109 to print the characters stored by character register 106. Recorder 109 thereupon records the message text transmitted by the remote station.

At the end of the message transmission by the remote station, code character "EOT" is received by station 102. Character detector 107 thereupon pulses output lead EOT. This clears READ flip-flop 121 and AND gate 108 disconnects the output of character register 106 from the input of recorder 109. The pulse on output lead EOT of character detector 107 is also passed by way of delay unit 119 and OR gate 124 to clear MESSAGE flip-flop 117. The clearing of MESSAGE flip-flop 117 removes the enabling potential from AND gate 110. It is noted, however, that due to the delay of delay unit 119, this enabling potential on AND gate 110 is not removed for about a character interval to enable the code character "EOT" to be passed to transmitter distributor 112. At the same time, the clearing of MESSAGE flip-flop 117 removes the application of the enabling potential from transmitter distributor 112 by way of OR gate 132. The clearing of this flip-flop thus restores the circuits at station 102 to the idle condition. It is, of course, assumed that the remote sending station now reapplies the code character "ENQ" to the line loop, offering control of the line to other stations.

As previously indicated, station 102 is designated as a monitoring station. The monitoring function involves checking the line loop during the polling mode to insure that the code character "ENQ" is being properly circulated around the loop. The additional circuits provided at station 102 for this purpose include $T_1$ timer 135, $T_2$ timer 136, PURGE flip-flop 130 and "A" generator 129.

The first function of the monitoring circuitry is to insure that at least one "ENQ" character is circulating during the polling mode since the character could vanish due to noise, temporary malfunction of the network and other reasons. The circulation of the "ENQ" character is timed by $T_1$ timer 135, which has a timeout period slightly greater than the longest possible system round trip propagation time.

While the system is in the polling mode, MESSAGE flip-flop 117 is in the CLEAR state, as previously described. The "0" output terminal of the flip-flop therefore provides a high potential to the RUN input of timer 135. This enables timer 135, which thus initiates its run concurrently with the initiation of the polling mode (MESSAGE flip-flop 117 being CLEAR upon the initiation of the polling mode, as previously described). In the event, however, that a station seizes control of the network, the start-of-message character "SOM" is received by station 102 and MESSAGE flip-flop 117 is SET, as previously described. This drops the potential at the "0" output terminal, disabling $T_1$ timer 135.

If no station seizes control and in the event that the code character "ENQ" is circulating normally around the system, each time it is received by station 102 character detector 107 pulses output lead ENQ. This pulse is applied to the RESET input of $T_1$ timer 135. The timer is thereby reset to start a new run. Accordingly, in the event that a station seizes control of the line or the code character "ENQ" is being circulated during the polling mode, $T_1$ timer 135 cannot time out.

If the code character "ENQ" is not being circulated during the polling mode and a station has not seized control to terminate the polling mode after a time period greater than the system round trip propagation time, $T_1$ timer 135 times out, providing a pulse to its output. This pulse is applied by way of OR gate 142 to $T_2$ timer 136, providing a reset for purposes described hereinafter. The output pulse of $T_1$ timer 135 is also passed by way of OR gate 125. As previously described, pulses passing through OR gate 125 are applied to ENQ generator 116 and are applied by way of OR gate 132 to transmitter distributor 112. This results in the application of the code elements of the character "ENQ" to transmitter distributor 112 by way of OR gate 111 and further results in the release of transmitter distributor 112 for a single character rotation, whereby the code character "ENQ" is applied to the line loop. Accordingly, the code character "ENQ" is reapplied to the line loop, restoring the normal polling mode and again permitting the several stations to seize control.

If during the new polling mode a station seizes control, MESSAGE flip-flop 117 is, of course, SET, to disable $T_1$ timer 135. If the character "ENQ" recirculates back to station 102, character detector 107 pulses output lead ENQ to reset $T_1$ timer 135. In either event, the loop and station 102 are returned to the prior normal operating condition.

There is a possibility that more than one "ENQ" character might be circulating around the loop. To deal with this possibility a "purging" operation is performed periodically under control of $T_2$ timer 136. This latter timer, therefore, has a timeout period which is preferably substantially greater than the timeout period of $T_1$ timer 135. For example, the timeout period may be greater than a plurality of round trip propagation times.

As previously described, MESSAGE flip-flop 117 is in the CLEAR state while the system is in the polling mode. In this state output terminal "0" applies a high potential to the RUN input of $T_2$ timer 136, thus permitting timer 136 to run during the polling mode. In the event, however, that a station seizes control of the loop, MESSAGE flip-flop 117 is cleared, disabling $T_2$ timer 136.

If no station seizes control, $T_2$ timer 136 will continue to run unless reset. One situation wherein timer 136 is reset is when a new "ENQ" character is loaded into a quiet system, since it is evident that this quiet system does not include a plurality of "ENQ" characters. This reset is accomplished by the timeout of $T_1$ timer 135. As previously described, $T_1$ timer 135, upon timing out, passes a pulse by way of OR gate 142 to the RESET input of timer 136. Timer 136 is thereby reset upon the timeout of $T_1$ timer 135.

The purging operation does not take place when non-"ENQ" characters are in the system. As described hereinafter, a predetermined code character is passed to the system during the purging operation and the presence of non-"ENQ" characters may provide confusion. To this end AND gate 139 is utilized to detect non-"ENQ" characters. One input lead to gate 139 is connected to output lead ALL of character detector 107 and this lead, as previously described, is pulsed upon the reception of any code character from the line. The other input lead to AND gate 139 is connected to output lead ENQ by way of inverter 138. This other lead is therefore enabled except upon reception of the code character "ENQ." Accordingly, AND gate 139 provides an enabling pulse at the output thereof upon the reception of any code character with the exception of the code character "ENQ." This pulse is passed by way of OR gate 142 to reset $T_2$ timer 136.

Assume now that the system is in the polling mode and $T_2$ timer 136 is neither disabled nor reset by any of the conditions described above. After the interval corresponding to the timeout time, $T_2$ timer 136 times out and provides a pulse to its output. This pulse is applied to the SET input of PURGE flip-flop 130, thereby setting the flip-flop. With PURGE flip-flop 130 set, its terminal output "0" potential drops, disabling AND gate 120 to preclude circulation of the "ENQ" character. The setting of PURGE flip-flop 130 also enables one input to AND gate 140. The output pulse of $T_2$ timer 136 is also passed to "A" generator 129 and to transmitter distributor 112 by way of OR gate 132. In response to the pulse, "A" generator 129 generates the code elements of the character "A" and passes them through OR gate 111 to transmitter distributor 112. The pulse applied by way of OR gate 132 releases transmitter distributor 112 for a single character rotation. Accordingly, the code character "A" is applied to the line loop.

At each of the other stations, upon the reception of the code character "A," it is passed on and around the loop. This can be accomplished by modifying the circuitry shown in station 102 by connecting output lead A of the character detector corresponding to character detector 107 to an input of monopulser 131. Since the other stations do not include a flip-flop corresponding to PURGE flip-flop 130, when the code character "A" is received gate 110 is enabled and transmitter distributor 112 is released for rotation, to thereby pass around the particular code character.

While the code character "A" is circulated around the loop, station 102 has opened the loop to purge the loop of all characters thereon. When the character "A" is received back at station 102, output lead A of character detector 107 is pulsed. This pulse is passed through AND gate 140, which is enabled, as previously described. The output of AND gate 140 is passed by way of OR gate 141 to the clear input of PURGE flip-flop 130. Thus, the flip-flop is restored to the CLEAR condition, whereby AND gate 120 is reenabled, again permitting the circulation of the "ENQ" character.

The output pulse of AND gate 140 is also applied through OR gate 125. As previously described, the application of a pulse through OR gate 125 operates ENQ generator 116 to apply the code elements of the code character "ENQ" to transmitter distributor 112 by way of OR gate 111. In addition, the pulse passed through OR gate 125 also passes through OR gate 132 to release transmitter distributor 112 for a single character rotation to therefore pass the code character "ENQ" to the line loop. Thus, during the purging operation all of the "ENQ" characters are purged from the line loop and at the termination of the operation a new "ENQ" character is generated and passed on to the line loop.

The purging operation will be interrupted if a station should seize control of the network. Upon this seizure, MESSAGE flip-flop 117 is set, as previously described. The setting of the flip-flop provides a positive transition at its terminal "1" output. This transition, in addition to being passed through OR gate 118 as previously described, is also passed through OR gate 141 to clear PURGE flip-flop 130. This restores station 102 to its normal condition.

Although a specific embodiment of this invention has been shown and described, it will be understood that various modifications may be made without departing from the spirit of this invention.

I claim:

1. In a data station selection system wherein a transmission line loop serially interconnects a plurality of data stations, each of the stations including means for passing data signals received over the incoming side of the line to the outgoing side of the line and further means effective when the station is bidding for opening the outgoing side of the line in response to a poll code data signal received over the incoming side of the line characterized in that the passing means also includes storing means for delaying data signals before passage thereof to the outgoing side of the line for an interval of time sufficient to permit the further means to open the outgoing side of the line before the poll code data signal is passed thereto.

2. In a data station selection system in accordance with claim 1 wherein each station also includes data message transmission means operated in response to the further means for sending a data message to the outgoing side of the line upon the opening thereof.

3. In a data station selection system in accordance with claim 2 wherein a poll code data signal transmission means responds to the data message transmission means at the termination of the sending of the data message by sending the poll code data signal to the outgoing side of the line.

4. In a data station selection system in accordance with claim 1 wherein at least one of the stations includes purge means for periodically opening the outgoing side of the line for a duration of time corresponding to the round trip propagation time of the transmission line loop.

5. In a data station selection system in accordance with claim 4 wherein the purge means includes means for applying a predetermined code signal to the outgoing side of the line upon the opening thereof and means responsive to the reception of the predetermined code signal from the incoming side of the line for terminating the opening of the outgoing side of the line by the purge means.

6. In a data station selection system in accordance with claim 4 wherein a poll code data signal transmission means responds to the termination of the opening of the outgoing side of the line by the purge means for sending the poll code data signal to the outgoing side of the line.

7. In a data station selection system in accordance with claim 1 wherein a poll code data signal transmission means operates in the absence of reception of the poll code data signal over the incoming side of the line for a predetermined interval of time to send the poll code data signal to the outgoing side of the line.

8. In a data station selection system wherein a transmission line is looped through successive stations, each of said stations including an arrangement which is effective when the station is bidding for seizing the line loop in response to a poll code received over the incoming side of the loop and further including, storing means, included in the line loop at each station, for storing the poll code received from the loop, means for opening the outgoing side of the loop when the station seizes the line loop to discard the poll code, and means for repeating the stored poll code to the outgoing side of the loop when the station is not bidding.

9. In a data station selection system in accordance with claim 8 wherein the seizing arrangement includes means responsive to the storage of the poll code in the storing means for initiating the line loop seizure.

10. In a data station selection system in accordance with claim 8 wherein the repeating means includes means responsive to the storage of the poll code in the storing means for initiating the repeating of the stored poll code.